No. 655,368. Patented Aug. 7, 1900.
C. E. O'KEENAN.
ELECTRICAL BATTERY.
(Application filed Dec. 30, 1897.)
(No Model.)
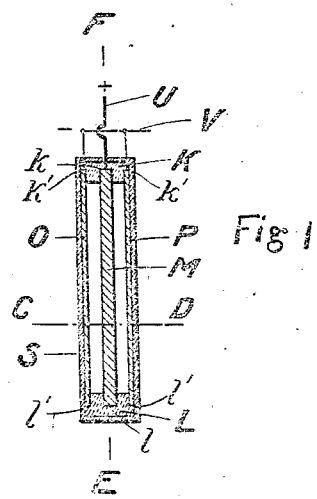
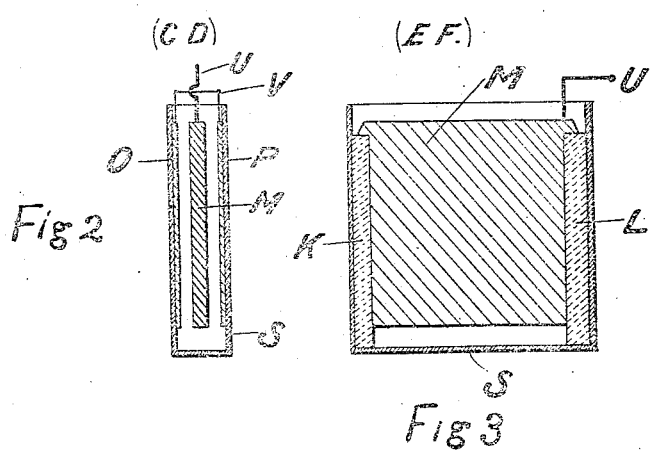
Witnesses,
George D. Richards
G. H. Walmsley
Inventor,
Charles E. O'Keenan
W. H. Babcock
J. Torpey

UNITED STATES PATENT OFFICE.

CHARLES EDOUARD O'KEENAN, OF PARIS, FRANCE.

ELECTRICAL BATTERY.

SPECIFICATION forming part of Letters Patent No. 655,368, dated August 7, 1900.

Application filed December 30, 1897. Serial No. 664,516. (No model.)

*To all whom it may concern:*

Be it known that I, CHARLES EDOUARD O'KEENAN, a subject of the Queen of Great Britain and Ireland, residing at Paris, France, have invented certain new and useful Improvements in Electrical Batteries, of which the following is a specification.

My invention relates to electrical batteries; and its object is to provide a battery in which the cost of materials is strictly in accordance with theory and in which the oxygen of the air is a gratuitous agent of depolarization.

In the accompanying drawings, Figure 1 represents a horizontal sectional view taken near the top of a cell embodying my invention. Fig. 2 represents a vertical section of the same on the line C D of Fig. 1, and Fig. 3 represents a vertical section on the line E F of Fig. 2.

S designates the tin-plate casing of the cell, in the ends of which wooden blocks K L are fastened, the said blocks being grooved in the middle, at $k$ $l$, to receive a lead plate M, the negative electrode also in their side edges $k'$ $l'$ $l'$ to receive the positive electrode zinc plates O and P. These grooves allow the said plates to be moved in or out without touching each other. The positive electrodes—the zinc plates O and P—are in contact with the tin wall of the cell, but there is no appreciable local action between them.

U and V designate, respectively, the wires making connection, respectively, with the negative and positive electrodes.

It is well known that the spongy lead negative plates of accumulators, such as the Faure-Sellon-Volkmar battery, get heated when they are exposed to the air after a full charge of current. That phenomenon is due to the production of suboxid of lead ($Pb_2O$) caused by the oxygen of the air. If a lead plate thus oxidized is put into a diluted solution of sulfuric acid for a few hours, the suboxid decomposes itself into metallic lead on the one part and protoxid of lead on the other, forming, with the acid, sulfate of lead embedded in the lead plates. If we take one of these plates so prepared and place it in a proper tank containing a solution of sulfate of zinc opposite a zinc plate of about the same size acting as a positive electrode, we will then have a cell, the negative electrode being lead, sulfate of lead, and sulfate of zinc, and the positive electrode being zinc, which gives a current as constant as the Daniell cell.

The above steps may be represented as follows:

Charge:
Oxidation by air: $2Pb+O=Pb_2O$
Sulfating: $Pb_2O+SO_4H_2=Pb+PbSO_4+H_2O$.

Discharge:
$Pb+PbSO_4+(ZnSO_4+H_2O)+Zn=$
$2Pb+(2ZnSO_4+H_2O.)$

There is an absolute difference between this battery and Becquerel's and other sulfate-of-lead batteries where the depolarization is very imperfect and the internal resistance very great. This difference can be explained by the different molecular state of the sulfate containing reduced metallic lead ($SO_4Pb+Pb$) in the whole material instead of sulfate of lead alone, ($SO_4Pb$,) as has been explained hereinabove. The negative lead and positive zinc plates can be put together in the same element in as great a number as required, and the aspect is exactly that of an accumulator, excepting that the peroxidized lead plate is replaced by a negative lead plate coated with lead sulfate, the negative plate by a positive zinc plate, and the acidulated water by sulfate of zinc. When the current lowers after a long discharge, the only thing necessary is to expose again the lead plates to atmospheric air in order to provoke a new oxidation, then to place these plates in acidulated water as before for a few hours, have the plates put into water to do away with the free acid, and finally place them again in the elements, causing a new discharge to be produced, and so on. The contact between the zinc or positive plates and the metal of the cell will prevent the oxidation of the latter, which might otherwise happen.

Other materials can be used for the tanks—glass, ebonite, pottery, wood, whether lined with lead or otherwise. As the battery works the sulfate of zinc increases in density, and consequently should be brought back to the proper dilution by a suitable supply of water.

The zinc forming the positive electrode may be preferably amalgamated; but this is not absolutely necessary, ordinary zinc answering nearly as well in certain cases, as sulfate of zinc has no action on the zinc plates as long as the circuit is open.

Having fully described my invention, what I claim, and desire to secure by Letters Patent, is—

1. In a battery-cell, the combination with a tin casing S of a negative electrode contained therein, consisting of a spongy lead plate, two zinc plates constituting the positive electrodes and in contact with the inner face of the said casing, the insulating-blocks K L fitted into the ends of the said cell and grooved to allow the independent insertion and withdrawal of the said plates, while keeping them apart from each other, electric circuit connections to said plates and an excitant for the said plates within the said casing, substantially as set forth.

2. In combination with the tin casing S, the spongy lead plate M' containing sulfate of lead and constituting a negative electrode, the zinc plates O P constituting positive electrodes and contained in the said cell, the insulating-blocks K L fitted into the ends of the said cell and grooved to allow the independent insertion and withdrawal of the said plates, while keeping them apart from each other, electric circuit connections to said plates and an excitant for the said plates within the said casing, substantially as set forth.

CHARLES EDOUARD O'KEENAN.

Witnesses:
EDWARD P. MACLEAN,
JOHN S. ABERCROMBIE.